United States Patent [19]
Hull-Allen

[11] Patent Number: 4,711,577
[45] Date of Patent: Dec. 8, 1987

[54] OPTICAL CONFIGURATION OF FIBER OPTIC SENSOR FOR SYMMETRIC DYNAMIC RESPONSE ABOUT THE OPTICAL NULL

[75] Inventor: Gregory Hull-Allen, Schenectady, N.Y.

[73] Assignee: Mechanical Technology Incorporated, Latham, N.Y.

[21] Appl. No.: 49,005

[22] Filed: May 7, 1987

Related U.S. Application Data

[63] Continuation of Ser. No. 709,560, Mar. 8, 1985, abandoned.

[51] Int. Cl.$^4$ .............................................. G01B 11/14
[52] U.S. Cl. ..................................... 356/373; 250/227
[58] Field of Search ........................ 250/227, 201 AF; 356/375, 373

[56] References Cited

U.S. PATENT DOCUMENTS 3,792,928  2/1974  Poilleux .............................. 356/382
3,940,608  2/1976  Kissinger et al. ................... 250/227

*Primary Examiner*—R. A. Rosenberger
*Assistant Examiner*—Crystal D. Cooper
*Attorney, Agent, or Firm*—Joseph V. Claeys; Joseph C. Sullivan

[57] ABSTRACT

A method of determining the displacement of a fiber optic sensor from a target in which a first lens is spaced from the target at a first distance an a second lens is spaced from said target at a second distance which provides the greatest intensity response at said first distance and thereafter spacing said first lens from said second lens to provide symmetrical slope values of response.

1 Claim, 8 Drawing Figures

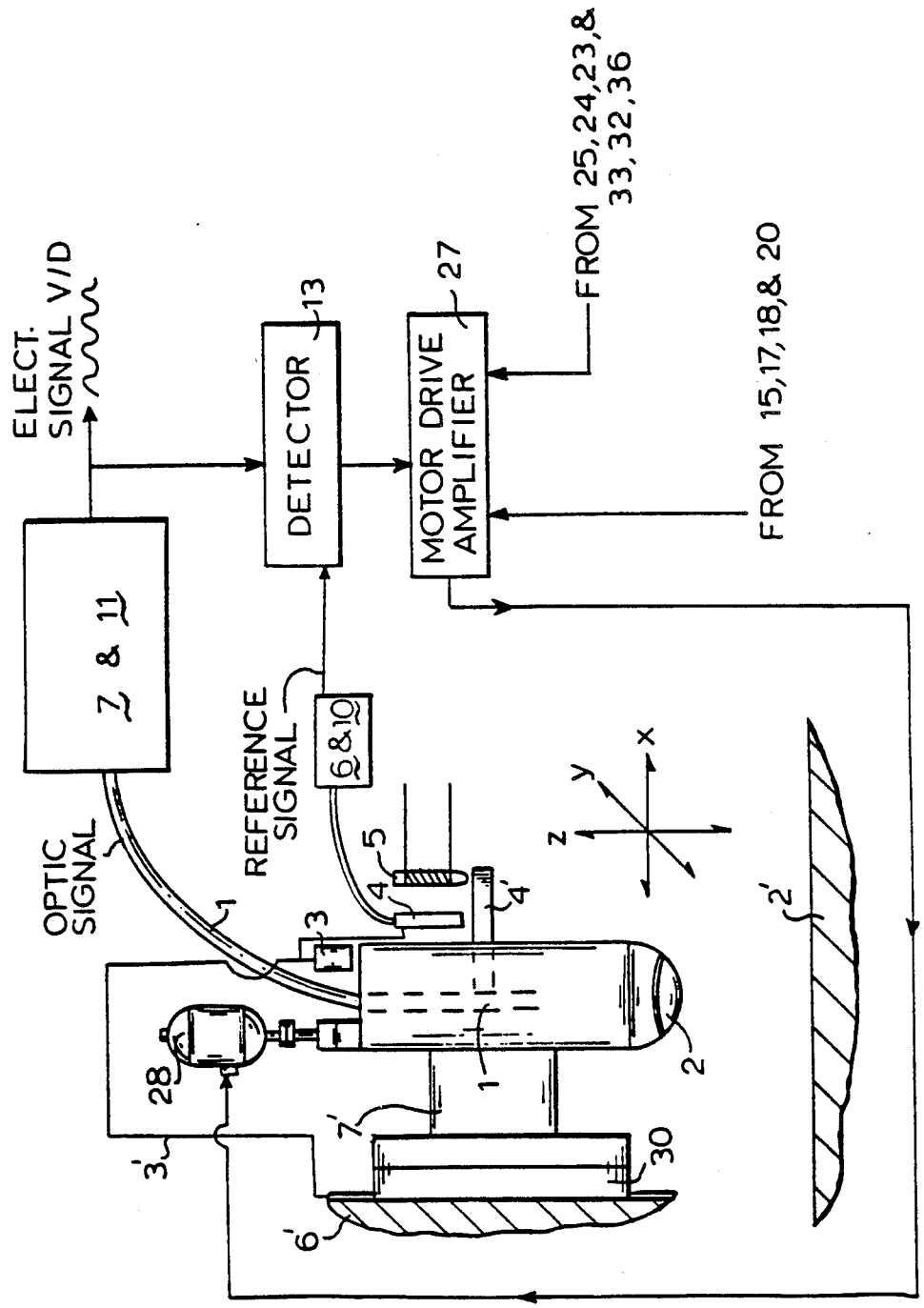

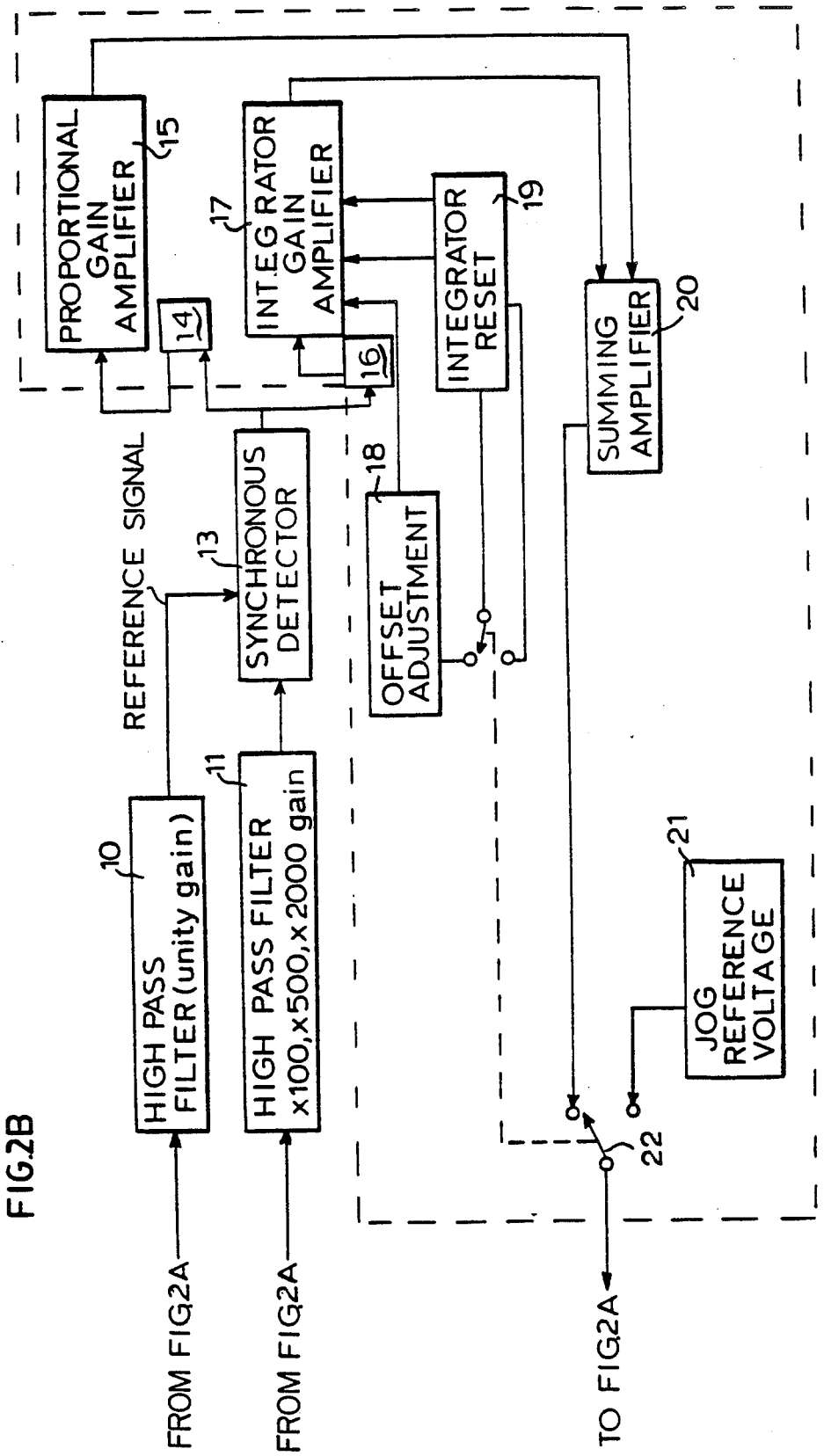

OPTICAL CONFIGURATION OF FIBER OPTIC SENSOR FOR SYMMETRIC DYNAMIC RESPONSE ABOUT THE OPTICAL NULL

This is a continuation of co-pending application Ser. No. 709,560 filed on Mar. 8, 1985 now abandoned.

FIELD OF THE INVENTION

The present invention relates to a proximity instrument and more particularly, to a fiber optic sensor with extender lens.

BACKGROUND OF THE INVENTION

The use of fiber optic proximity probes or fotonic sensors utilizing bifurcated fiber optic bundles and sensors and detectors to determine the distance to a target are well known. Such devices utilize a light beam transmitted from a light source by way of a bundle of light conducting optical fibers (transmit fibers) from a light source to a target. The light is reflected off the target and returned along other optical fibers (receive fibers) in the bundle back to a light intensity sensor. The intensity of the returned light is a function of the distance between the proximity probe tip and the target, so the output of the light sensor can be a very precise measure of that distance, or more importantly changes in that distance. Such a system is shown and described in U.S. Pat. No. 3,940,608 in which an extender lens is utilized.

However, it has been found that due to variations in the operating parameters, particularly the reflectivity of the target, a manual adjustment was necessary i.e., increasing or decreasing the source intensity or distance of the probe from the target, in order to maintain the accuracy of the distance reading once reflectivity had changed. While in certain applications, such manual readjustment was acceptable, in other situations where perhaps the probe is inaccessible or required to be fixedly mounted, such manual adjustment becomes impossible.

Accordingly, there arose a need to provide for automatically compensating for a change in reflectivity. While there have been many attempts to provide for such a feature, there still remains a need for a single yet effective means of compensating for reflectivity changes.

SUMMARY OF THE INVENTION

In commonly assigned United States application Ser. No. 709,582 filed on even date herewith, entitled "Precision Optical Displacement Measuring Instrument Using Servo Controlled Fiber Optic Sensor", the teachings of which are incorporated herein by reference there is described a noncontacting displacement measurement measuring instrument which utilizes a probe similar to that shown and described in U.S. Pat. No. 3,940,608. In the application for patent, an electromechanical system is provided which enables a probe to lock onto the null point and remain in focus and follow the target. If the target moves toward or away from the probe, the entire sensor assembly moves in the same direction to maintain a focus lock condition. The movement of the probe is measured by means of a servo-loop system in order to determine the movement of the surface. The present invention provides an unique alignment of the optical elements of a probe to achieve a symmetric null regardless of the direction of displacement.

BRIEF DESCRIPTION OF THE DRAWINGS

In the FIGS.:

FIG. 1 is a simplified diagrammatic illustration of a proximity instrument incorporating the present invention;

FIGS. 2A, 2B is a more detailed diagrammatic illustration of the instrument shown in FIG. 1;

DESCRIPTION OF THE PREFERRED EMBODIMENT

Figure 3:
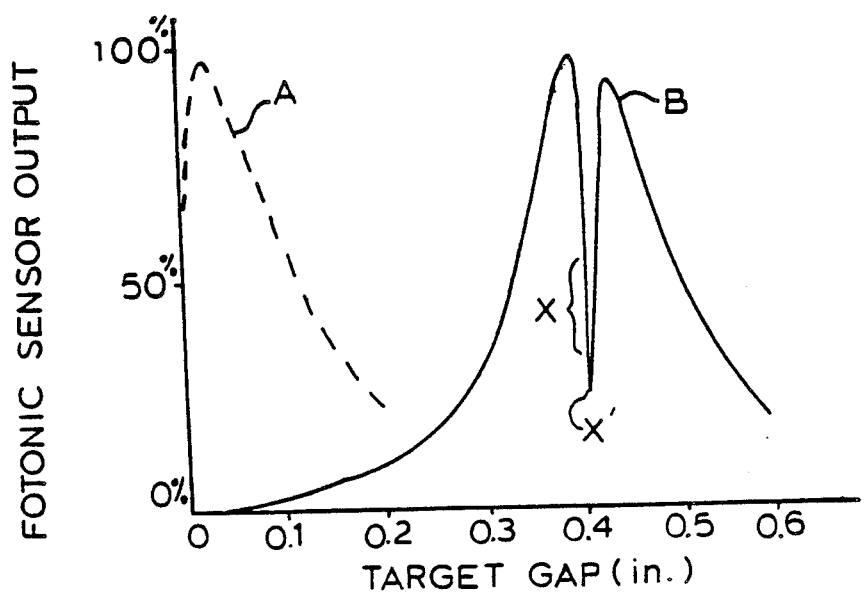
FIG. 3 is a graphical representation of the operation of the device.

The proximity instrument utilizes a probe composed of a fiber optic sensor and a lens such as that described in U.S. Pat. No. 3,940,608 with an output signal which is illustrated in FIG. 3. The fiber optic sensor lens assembly is identified by the numerals 1 and 2 in FIG. 1. The sensor and lens combination has a response curve similar to that shown in FIGS. 3 and 4 which illustrate the change in the probe output signal with movement of the probe toward and away from the target. The sensor 1 and the lens 2 are coupled together so that a single mechanical structure results. The numeral 2' identifies the target.

In this invention the fiber optic sensor and lens assembly are vibrated in the direction of the probe axis, toward and away from the target. This is referred to as a dither. Vibration is accomplished by providing a mechanical structure 6' and an electromagnetic transducer 5. An AC signal is applied to transducer 5 and it provides a magnetic force to member 4' and forces the assembly to vibrate. Structural support 6' is the mechanical ground or reference or mechanical reference point. Spring means or flexure 7' allows the probe assembly to flex. The typical dither frequency is 100 Hz although it could be in the range from 10 Hz to 1000 Hz. This is typical but the frequency can be any reasonable selected frequency. The vibration amplitude is typically on the order of about 2 mm maximum.

Observing the response curve shown in FIG. 3 and labelled B, it is noted that the system works around the point of the null X'. When a dither is applied, the probe is actually oscillating back and forth around the null point X'. The fiber optic sensor electronics 7 provides an output voltage proportional to displacement. The output voltage is an AC signal caused by the dither motion. That AC signal will be twice the frequency of the dither. For example, if the system is off the null and was operating in the region X, a one-to-one relationship between the dither and the output is obtained and they would be the same frequency. However, dithering about the point X' as the mechanical dither goes negative away from X', the signal rises and as the mechanical dither goes positive away from X', it also goes positive. By virtue of operating on null, going up on both sides, the output is twice the frequency.

Curve A in FIG. 3 is provided for comparison and is the curve achieved by a fiber optic sensor without an optic lens as explained in the before identified U.S. Pat.

No, 3,940,608. Numerals 7 and 11 in FIGS. 1 and 2 identify the electronics. Sensor 1 with associated electronics 7 and 11 provide a standard fiber optic sensor system. The optic signals are indicated as entering 7, 11 from the left in FIG. 1 and exiting as electrical signals. Electronics 7 is the standard fiber optic sensor electronics, the function of which is to convert the light output of electrical signals, somewhat similar to the teaching in U.S. Pat. No. 3,940,608, and electronics 11 is signal conditioning electronics added to amplify the AC dither signal.

The electronics 7, 11 provides an electrical output that allows for the obtaining of a measurable signal as shown in the FIG. 3. Whenever the target to probe distance changes, the electrical output of 7, 11 follows the curve B in FIG. 3. If the asembly is in the off-the-null condition at $X_o$, namely out of focus—and then dithered at that point, an output containing a component synchronous with the dither frequency appears at 7, 11 output. However, beginning to dither at X', in focus, because the transfer function reverses direction, the electrical output at 7, 11 will be twice the frequency of the dither and there will be no component synchronous with the dither frequency.

An error detection circuit 13 is shown in FIG. 1 at the output of 7, 11. When starting-up in focus and dithering, the output of 7, 11 is twice the frequency of the dither signal. If the target to probe distance changes slightly, there occurs an out of focus condition. The output of 7, 11 will still contain a signal which is twice the frequency of the dither but it will also begin to show a component, which is the same frequency as the dither, as the central point of the dither signal moves to one side of X'—the null point. A combination of signals results. The function of the error detection circuit 13 is to measure the amplitude of that fundamental signal, which is the frequency of the dither. That same frequency component is the fundamental and the fundamental frequency is the dither frequency. The function of 13 is to detect the value of fundamental in the output at 7, 11. Dither amplitude sensor 4 and electronics 6 and 10 produce an AC signal proportional to and synchronous with the fundamental probe motion. This fundamental probe motion signal is a reference signal to detector 13. When the probe is in focus, the output of the detector 13 is zero. As it begins to go out of focus on either side, the output of the detector increases. The output of detector 13 has polarity such that the direction in which the target moves toward or away from the probe can be determined. The detector 13 is configured so as to measure only fundamental; accordingly any other signals may be filtered out. Essentially, detector 13 provides an output which signifies amount or distance out of focus and in which direction.

The output of detector 13 drives the motor 28 through motor drive amplifier 27 which moves the probe back to the null position thus closing the "loop" of the servo system. This brings the probe and lens into focus. Thus a servo system is provided which will position the probe to always be a fixed distance from target and essentially stay locked in focus.

Means are provided to measure the movement of the probe necessary to bring it back into focus. Displacement sensor 3 is provided which is mechanically referenced by means 3' to mechanical frame of reference or mechanical ground 6'. This prevents sensor 3 from having introduced into it, the movement of the dither or the movement of the probe. Sensor 3 can be for example, a displacement sensor such as an LVTD.

Figure 2A:
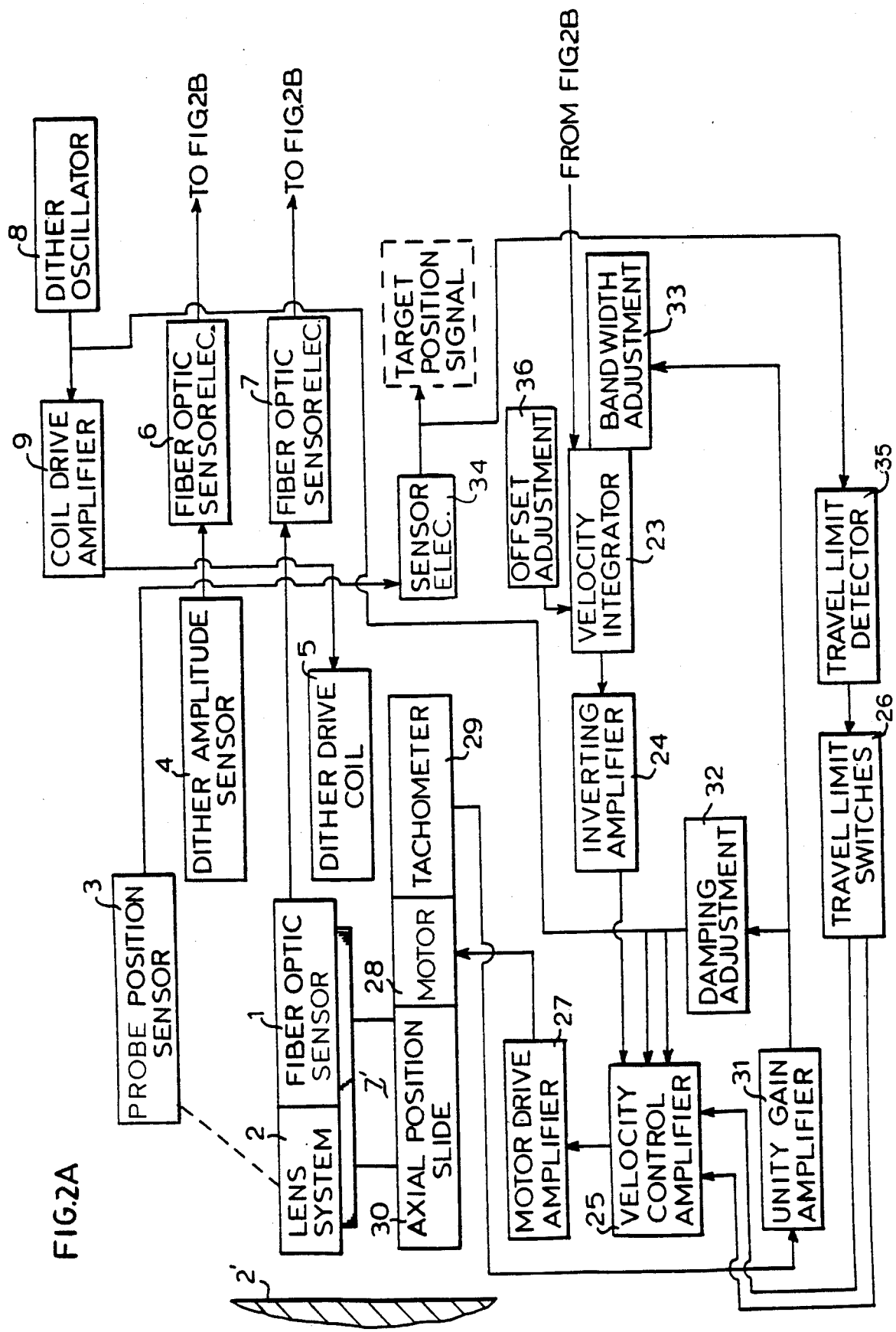

FIGS. 2A, 2B provide a more detailed overall view of the system shown in FIG. 1. The numerals used to identify components in FIGS. 2A, 2B are the same used to identify similar components in FIG. 1. Thus, numeral 1 is the fiber optic sensor; numeral 2 is the lens system. Components 7 and 11 shown in FIGS. 2A, 2B collectively convert the optical signal from the probe, first to an electrical signal indicating displacement, then a high pass filter to remove low frequency components.

The function of high pass filter 11 is to remove low frequency elements in the fiber optic probe signal below 50 Hz. Those elements would arise from the overall gross motion of the probe as it is following the target. The intent is to have the output of 11 contain just the signal elements which arise from the dither of the probe assembly. The dither sensor and electronics are identified by numerals 4, 6 and 10. To enable the error detection system to operate properly, it is necessary to measure the dither motion directly. That is done by adding another fiber optic sensor which is identified by the numeral 4. That is mounted such that it can measure the dither vibration of the probe assembly composed of sensor 1 and lens 2. Component 6 is a standard fiber optic sensor electronics similar to component 7. Component 10 is another high pass filter, the purpose of which is to condition the signal to contain only components resulting from the dither. Component 13 in FIG. 2B is a detector which receives the dither signal which is called the reference and the actual probe signal which is measuring the output of the probe 1 and 2 as it vibrates or dithers with respect to the target. The output of 13 provides an error signal which indicates how far the probe assembly composed of sensor 1 and lens 2 is off null in the optical response curve and it also indicates the direction from the null—either towards the probe or away from probe.

The detected distance signal which is the output of the detector 13 is amplified and phase shifted by the circuit composed of amplifier 15, integrator amplifier 17 and summing amplifier 20. This provides a velocity error signal that sets the value of motor velocity which is needed to drive the axial position slide 30 in a stable manner and maintain the lens to target gap a constant value. Component 14 is a gain adjustment for the proportional gain amplifier 15 and component 16 is gain adjustment for the integrator 17. Numerals 14 and 15 designate an adjustable gain amplifier. Components 16 and 17 provide an adjustable integrating gain amplifier. These are all controls that allow the servo control system operation to be stable as the probe follows the target motion.

The closed loop signal actually passes through member 13 and then through components 14 through 20 and then back to the motor drive. Components 14 through 20 are circuit elements that provide integration and gain and summing. These provide for conditioning the signal to the desired velocity error signal.

Proportional gain adjustment 14 and the integrator gain adjustment 16 are included in the circuit to set the gain and phase-shift values to optimize the band width and slew rate of the servo system.

The integrator reset circuit box 19, is used to reset or zero the integrator when the position control loop is opened with the job servo-on-switch, number 22. Switch 22 and the jog reference roll 21 are convenience features that are in the system. These all provide means of controlling the motor drive 28 which is a conventional rotational electric motor. The motor 28 is coupled to a gear reducer in one embodiment. It has a 30/1 ratio and a flexible coupling between. The output of the gear reducer drives a lead screw which is connected to a nut which is on the position slide. Motor drive amplifier 27 provides a voltage output which controls the speed and direction of rotation of the motor drive 28 and causes the slide 30 to traverse back and forth. It moves the probe assembly composed of sensor 1 and lens 2 towards or away from the target. The control of the rotational speed of motor 28 is accomplished by the feedback system composed of integrator 23, inverting amplifier 24, velocity control amplifier 25 and the motor drive amplifier 27. The feedback system is close through tachometer 29. The output of the tachometer 29 goes to amplifier 31 which feeds back to components 32 and 33.

Components of the velocity control system are configured to produce a motor speed that will follow the voltage output of the summing amplifier in a stable manner. The output of 20, the summing amplifier, is an error signal. If it goes plus or minus, it creates an output through the path from components 22 through 27 which causes the motor to move and the system senses that movement via the tachometer 29 which provides a signal back into the amplifier 31.

Components 32 and 33 are additional adjustments to set up the servo-loop. These components provide a damping adjustment, and a band width adjustment 36 for the control of the motor velocity. The offset adjustment 36 provides a means of setting the motor speed to zero when there is zero voltage value at the output of the amplifier 20.

There is also provision for limiting the axial motion of the slide to prevent the entire system from travelling to the extreme end of the travel and running into the mechanical limit of slide 30. Travel limit detector 35 derives a signal from sensor 3. This is used to provide a sensor which measures the overall movement of the probe assembly. It could be any kind of displacement sensor such as an LVTD or a capacitance probe. The output of component 3 is fed to signal conditioning electronics to provide a voltage proportional to the displacement that is measured. The sensor electronics are provided in component 34. That output is fed to component 35 in which limits can be set on the voltage which corresond to travel limits of the axial position slide such as making the gain of velocity control amplifier 25 zero for drive signals that will cause motion beyond the travel limit. There are different ways that this can be implemented. It could use only the voltage limits in the detector; it can also have mechanical switches at stop points in the probe such as component 26 or a combination of both. If the mechanical or the voltage limits are exceeded, signals are provided to component 25 the velocity control amplifier to cause the motor to stop moving. Generally, there is then some action required on the part of the operator to come back and through the manual jog capability to reposition the system back into normal operating range.

In operation dither oscillator 8 creates an AC signal typically around 100 Hz which is fed to coil drive amplifier 9 to drive electromagnetic coil 5 which is an electromagnetic device which causes an AC magnetic force which couples to the flexures shown between the probe assembly 1, 2 and the axial position slide 30 causing the probe assembly, 1 and 2 to vibrate about the focus distance point in a direction perpendicular to the target. The fundamental of the vibration is detected when the central point of the dither is no longer the focus distance point upon change in distance between probe and target and through the servo-loop the in focus position of the probe is restored with the required movement for restoration of focus determined to provide an output signal which is a measure of the position of the target with respect to the probe.

A further improvement is included herein wherein a dither is applied to the motor drive which is not the dither on the probe referred to elsewhere.

It is noted that the drive motor, reduction gear and lead screw have friction inherent in them which causes some drag and hysteresis in operation as the motor moves back and forth. This can cause what is known as a deadband in the system response which adversely affects the response of the system. It displays an inherent instability as it tries to home in on a particular null point. It hunts to a degree that is unacceptable. The amplitude of the hunt is greater than the desired accuracy. The solution to this problem as taught herein involves imposing a small amount of dither or oscillation on the motor drive voltage. This is in addition to the dither discussed above. This causes the motor to oscillate or vibrate rotationally and enables it to avoid becoming stuck by static friction and enables the system to average its response and achieve the proper null point. The result is that the stability of the system output is improved to acceptable limits. This is accomplished by an electronic oscillator which produces a 100 Hz AC signal which is applied to the motor drive circuit.

In FIGS. 2A, 2B, dither oscillator 8 provides the dither signal for the original dither drive. That same signal is also provided to velocity control amplifier 25 for the motor drive amplifier 27. In effect, there has been added to the motor drive signal, a 100 Hz AC signal which appears at the output of motor drive amplifier 27 which forces the motor to continuously oscillate.

Figure 4:
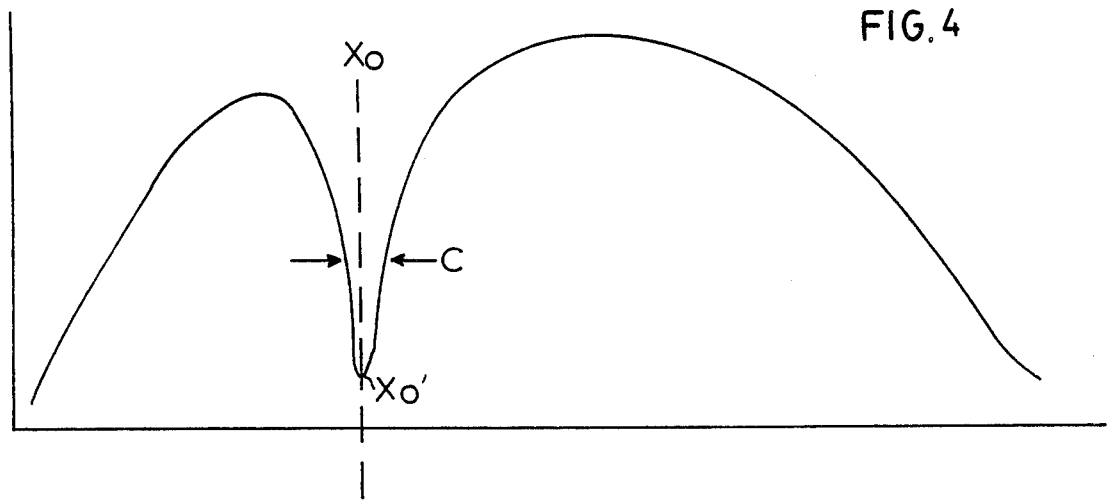
FIG. 4 is a typical response curve for a fiber optic sensor with lens extender.

In FIG. 4 there is shown a typical response curve for the fiber optic sensor with the lens extender. On either side of the null $X_o$, the response curve in general is not symmetric in actual implementation. There is a difference in slope on the left and right side of the null. This slope difference leads to an undesirable characteristic because the slope of the response curve affects the gain and stability of the control system response. Having a difference in the slopes or a non-symmetric response, leads to different static stability and dynamic response characteristics in the control system on either side of the null point. Therefore, it is desirable to achieve a symmetric response about the null.

It has been found theoretically and experimentally that by unique alignment of the optical elements a symmetric null can be achieved resulting in the same control system response regardless of which direction the displacement about $X_o$ occurs.

The present invention recognizes that the slope on either side of the optical minima exhibited by the relationship of received light by the fiber optic sensor and lens vs. probe-to-target gap in the system is important to proper control of the probe as it follows the target motion. The actual shape of the optical response and the characteristics of the minima set the fundamental performance limits of the control system. As the actual optical response does not directly indicate whether the probe-to-target gap is greater or less than the gap at the minima, the slope of the response is used to produce a position error signal. This being the case, the value of the first derivative, or slope, of the optical response of the fiber optic sensor and lens combination represents the servo control signal gain which can be derived from a particular optical configuration.

Figure 6:
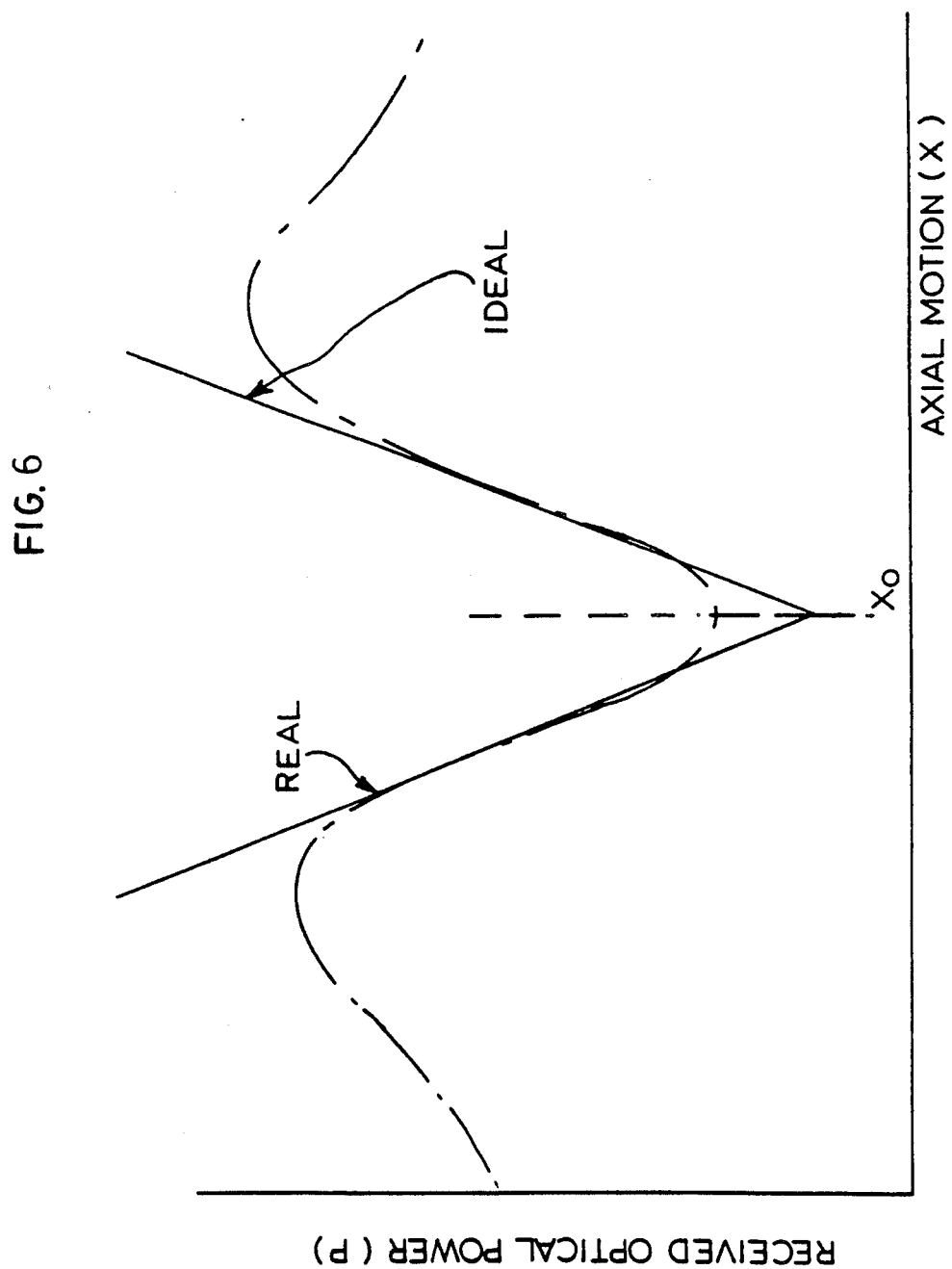
FIG. 6 is a graphical illustration of the performance of the optic shown in FIG. 5.
Figure 7:
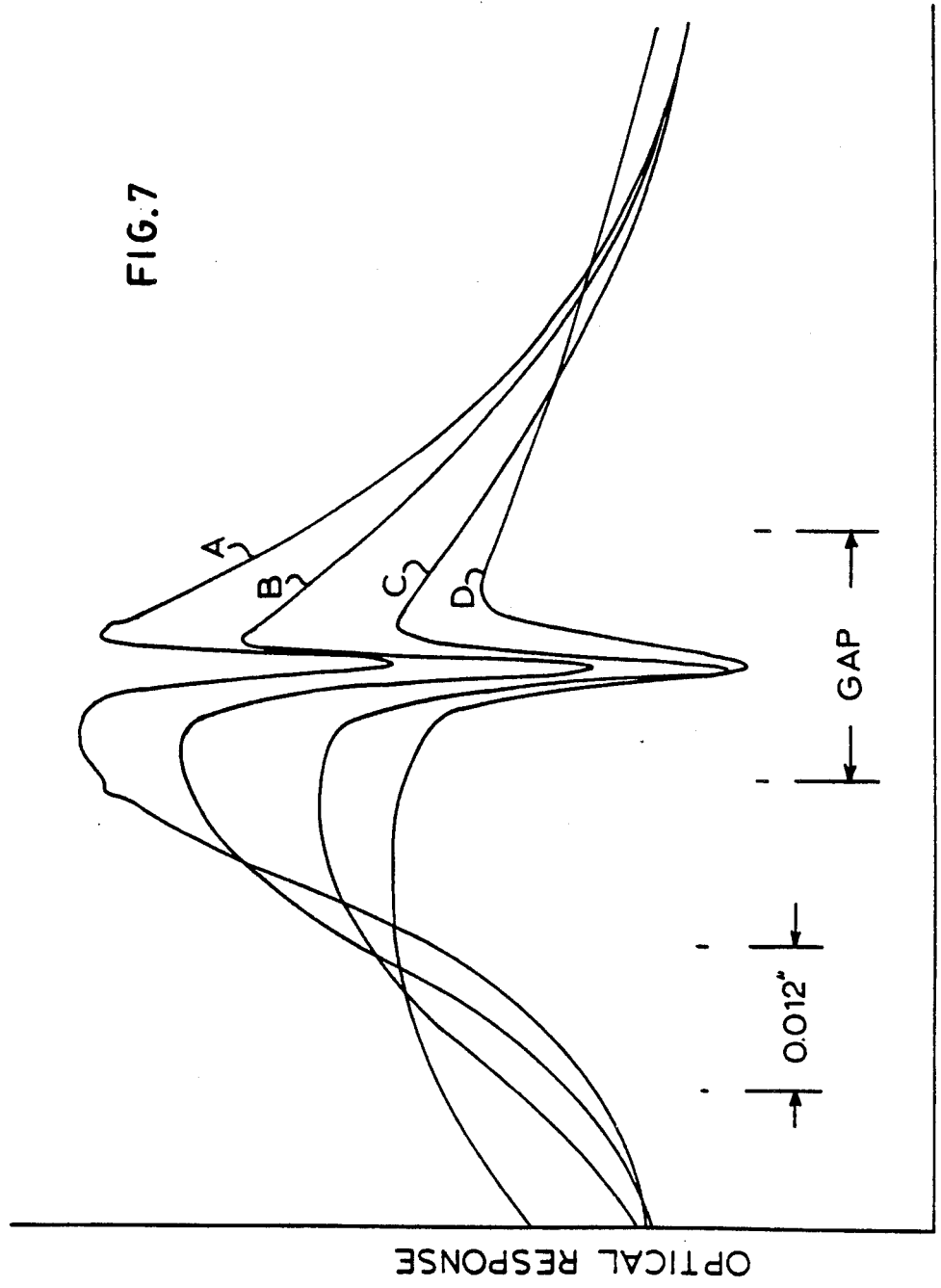
FIG. 7 illustrates the results of changes in the spacing between optical elements.

FIG. 6 shows the comparison between the ideal, optimum fiber optic and lens combination response versus the real response found in the probe system. In the ideal case, the optical response at the minima $X_o$ is discontinuous and the slopes of the curve on either side of the minima are equal in magnitude. At $X_o$ the slope change abruptly between a positive and a negative value such that for X $X_o$ the slope is negative and for X $X_o$ the slope is positive. In all known real imaging optical configurations for the fiber optic sensor and lens system, $P=f(X)$ is not discontinuous at $X_o$ and the slopes on either side of $X_o$ are in general unequal. Since the system servo gain is proportional to the slope value, it is essential for optimum static and dynamic system performance that the slope of the fiber optic probe and lens optical characteristic on either side of the minima be made equal in value and oppsity in polarity. This characteristic is necessary to ensure that the control system operation is identical on either side of the $X_o$ minima.

Figure 5:
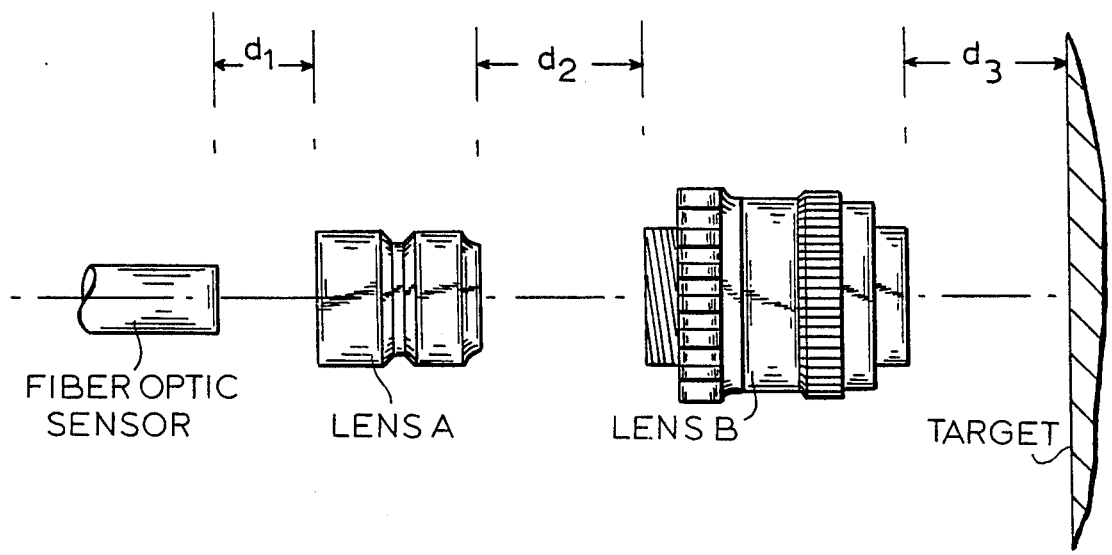
FIG. 5 is an exploded view of an improved optic incorporating the present invention.

It has been shown both theoretically and experimentally that an optical probe configureation, comprising a fiber optic sensor and two lenses as shown in FIG. 5 provides the symmetrical optical characteristic necessary to ensure that the control system operation on either side of the minima is identical. The optimization procedure to produce the symmetrical characteristic involves varying the spacing $D_1$, between the sensor face of the fiber optic sensor and the rear face of lens A, and the spacing $D_2$, between the front face of lens A and rear face of lens B. Spacing $D_3$, between the front of lens B and the target, is set at a suitable fixed value such as 0.150 inch. This fixed value was set by the system requirement for the standoff distance between the probe and the target.

The theorical optimal values for $D_1$ and $D_2$ to produce a symmetrical characteristic were selected on the basis of matching of the exit and entrance pupils for the imaging optics consisting of lens A and B, matching of the exit pupil of lens B to an average entrance pupil of the fiber optic sensor bundles, and tailoring of the angles of incidence of the primary reflected light rays from the target to the optical fibers. This results in an optical configuration which guides reflected light from the target to the fiber optic sensor receiving fibers in an identical manner on either side of the minima $X_o$. The theoretical optimum values for $D_1$ and $D_2$ derived from ray optics analysis are shown to not only equalize the slopes on either side of the minima, but to produce a slope magnitude greater than had been found with previously chosen lens and fiber optic spacing values. In practice spacing $D_2$ is selected on the basis of the largest slope value possible for a given value of the spacing $D_3$. Spacing $D_1$ is then selected to provide the symmetrical slope values.

Experimental data verified that varying $d_1$ and $d_2$ spacing valves results in optimizing of the optical system. FIG. 6 shows actual performance data taken with the optics illustrated in FIG. 5. The separate curves of FIG. 6 show an example of the results of changes in spacing of the optical elements, the effect of varying the object distance $d_1$. There is a direct effect on the slope of the optical response about the minima as the $d_1$ length is set at four values. Curve C represents the optimum value of $d_1$ that produces equal slope characteristics on either side of the null region. Curves A and B illustrate that shorter $d_1$ lengths result in a higher slope value on the right side of the null than on the left. As the $d_1$ length is increased beyond the optimal value, as shown by curve D, the slope to the left of the null is greater than the slope to the right.

I claim:

1. A method of determining the displacement of a fiber optic sensor from a target in which a first lens is spaced from the target at a first distance and a second lens is spaced from said target at a second distance which provides the greatest intensity response at said first lens to achieve the largest response slope value for a given distance and thereafter spacing said first lens from said second lens to provide symmetrical slope values of response.

* * * * *